United States Patent
Sheng et al.

(10) Patent No.: US 11,494,031 B2
(45) Date of Patent: Nov. 8, 2022

(54) TOUCH INPUT CALIBRATION

(71) Applicant: Sentons Inc., Grand Cayman (KY)

(72) Inventors: Samuel W. Sheng, Saratoga, CA (US); Lapoe E. Lynn, Los Altos, CA (US); Stanislav Maximov, Mountain View, CA (US); Yenyu Hsieh, San Jose, CA (US)

(73) Assignee: Sentons Inc.

( * ) Notice: Subject to any disclaimer, the term of this patent is extended or adjusted under 35 U.S.C. 154(b) by 0 days.

(21) Appl. No.: 17/000,352

(22) Filed: Aug. 23, 2020

(65) Prior Publication Data

US 2022/0057886 A1 Feb. 24, 2022

(51) Int. Cl.
 *G06F 3/041* (2006.01)
 *G06F 3/045* (2006.01)

(52) U.S. Cl.
 CPC ............ *G06F 3/0418* (2013.01); *G06F 3/045* (2013.01); *G06F 3/04144* (2019.05); *G06F 2203/04106* (2013.01)

(58) Field of Classification Search
 CPC .... G06F 3/0418; G06F 3/045; G06F 3/04144; G06F 2203/04106
 See application file for complete search history.

(56) References Cited

U.S. PATENT DOCUMENTS

| | | | |
|---|---|---|---|
| 9,164,605 B1 * | 10/2015 | Pirogov | G06F 3/0446 |
| 9,244,562 B1 | 1/2016 | Rosenberg | |
| 9,977,537 B2 * | 5/2018 | Molne | G06F 3/04142 |
| 10,338,718 B2 * | 7/2019 | Ramakrishnan | G06F 3/04144 |
| 10,635,255 B2 * | 4/2020 | Kugler | G06F 1/1626 |
| 10,969,906 B2 * | 4/2021 | Chen | G06F 3/0446 |
| 11,216,177 B2 * | 1/2022 | Seomoon | G06F 3/0482 |
| 2009/0020343 A1 * | 1/2009 | Rothkopf | H03K 17/955 178/18.05 |
| 2010/0085317 A1 | 4/2010 | Park | |
| 2010/0088654 A1 | 4/2010 | Henhoeffer | |
| 2012/0127069 A1 | 5/2012 | Santhiveeran | |
| 2012/0284620 A1 | 11/2012 | Yach | |
| 2013/0141365 A1 | 6/2013 | Lynn | |
| 2014/0043295 A1 * | 2/2014 | Alameh | G06F 3/041 345/175 |
| 2014/0160010 A1 | 6/2014 | Jung | |
| 2014/0359438 A1 | 12/2014 | Matsuki | |
| 2016/0179338 A1 | 6/2016 | Miller | |
| 2017/0038905 A1 * | 2/2017 | Bijamov | G06F 3/0414 |
| 2017/0310321 A1 * | 10/2017 | Toda | H03K 17/964 |
| 2018/0059865 A1 * | 3/2018 | Qu | G06F 3/017 |
| 2018/0067601 A1 * | 3/2018 | Winokur | G06F 3/0414 |
| 2018/0136770 A1 | 5/2018 | Kwong | |

(Continued)

*Primary Examiner* — Bryan Earles
(74) *Attorney, Agent, or Firm* — Van Pelt, Yi & James LLP

(57) ABSTRACT

Techniques for detecting touch inputs are described. A system for detecting touch inputs includes force sensors, touch sensors, one or more processors and one or more memories coupled to the processor(s) and configured to provide the processor(s) with instructions. The processor(s) receive force measurements from the force sensor(s) and receive imputed force measurements from the touch sensor(s). Based on at least the imputed force measurements, the processor(s) identify touch inputs. One or more touch input criteria are calibrated based upon the force measurements and the imputed force measurements.

23 Claims, 8 Drawing Sheets

(56) References Cited

U.S. PATENT DOCUMENTS

| | | |
|---|---|---|
| 2018/0224963 A1* | 8/2018 | Lee .................. G06F 3/017 |
| 2019/0074833 A1 | 3/2019 | Sheng |
| 2019/0179469 A1 | 6/2019 | Quinn |
| 2019/0243471 A1 | 8/2019 | Foss |
| 2019/0346969 A1* | 11/2019 | Yip .................. G06F 3/0412 |
| 2020/0050304 A1* | 2/2020 | Rosenberg .......... G01S 17/88 |
| 2021/0089133 A1 | 3/2021 | Sheng |

* cited by examiner

TOUCH INPUT CALIBRATION

BACKGROUND OF THE INVENTION

Various electrical components can be used to detect a physical disturbance (e.g., strain, force, pressure, vibration, etc.) and provide a corresponding signal. For example, a component may detect expansion of or pressure on a particular region on a device and provide an output signal in response. Such components may be utilized in devices to detect a touch. For example, a component mounted on a portion of the mobile phone may detect an expansion or flexing of the portion to which the component is mounted and provide an output signal. The output signal from the component can be considered to indicate a purposeful touch (a touch input) of the mobile phone by the user. However, a mobile phone may undergo flexing and/or localized pressure increases for reasons not related to a user's touch. In addition, a user touching other regions of the mobile phone may result in an expansion and/or local pressure increase of the portion to which the component is connected. Such situations can result in false detections of touch inputs. Other situations in which a user purposefully touches a region of the mobile device may not result in detection of a touch input. For example, a user touching the mobile device with a gloved hand may not be detected as a touch input. Consequently, an improved mechanism for accurately detecting touch input is desired.

BRIEF DESCRIPTION OF THE DRAWINGS

Various embodiments of the invention are disclosed in the following detailed description and the accompanying drawings.

DETAILED DESCRIPTION

Figure 1:
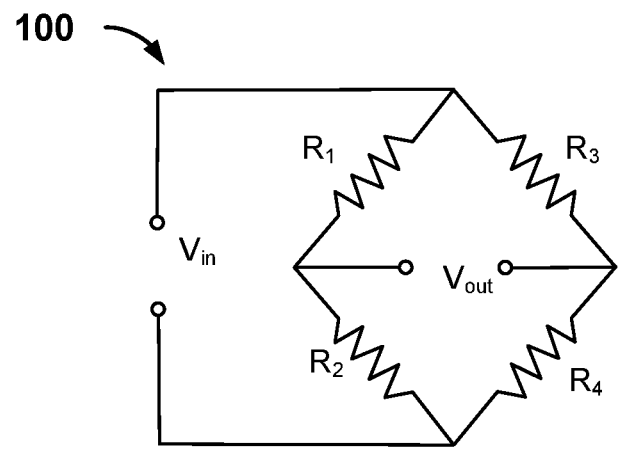
FIG. 1 is a schematic diagram illustrating an embodiment of a piezoresistive bridge structure usable as a strain sensor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

User touches of a device such as a mobile phone (e.g. a smart phone) or touch screen are desired to be detected. Further, purposeful touches by a user (touch inputs) are desired to be distinguished from other physical input, such as bending of the device and environmental factors that can affect the characteristics of the device, such as temperature. In some embodiments, therefore, a touch input includes touches by the user, but excludes bending and temperature effects. For example, a swipe or press of a particular region of a mobile phone is desired to be detected as a touch input, while a user sitting on the phone or a rapid change in temperature of the mobile phone should not to be determined to be a touch input. Similarly, characteristics of the user are desired to not adversely affect utilization of the device. For example, the user wearing a glove is desired to not significantly impact the ability to detect a touch input by the user's (gloved) hand.

Techniques for detecting touch inputs are described. In some embodiments, a system for detecting touch inputs includes force sensors, touch sensors, one or more processors and one or more memories coupled to the processor(s) and configured to provide the processor(s) with instructions. In some embodiments, the touch sensors include piezoelectric sensors. The force sensors include strain sensors in some embodiments.

The processor(s) receive force measurements from the force sensor(s) and receive imputed force measurements from the touch sensor(s). Based on at least the imputed force measurements, the processor(s) identify touch inputs. In some embodiments, identifying the touch inputs includes detecting a touch input detected based on the imputed force measurements. In some embodiments, the touch inputs may be identified using touch and force measurements. At least one touch input criterion are calibrated based on the force and imputed force measurements. In some embodiments, a portion of the force measurements are temporally correlated with the touch input. The one or more touch input criterion are calibrated based on the force measurements temporally correlated to the touch input. The touch input criterion so calibrated corresponds to the touch sensor.

The system may also include temperature sensor(s) configured to provide temperature measurements corresponding to the force sensor. The processor(s) further correct the portion of the force measurements based on the temperature measurements. Thus, corrected force measurements are determined. In some embodiments, the corrected force measurements correspond to absolute force(s). To calibrate the touch sensor criteria, a measured force corresponding to the imputed force measurements are normalized to the absolute force(s). A remaining portion of the force measurements correspond to a baseline for the plurality force sensors.

The touch sensor may include both transmitter(s) and receiver(s). The transmitter(s) provide ultrasonic signal(s) across a surface of a device, which are received at the receiver. In response, the receiver provides the imputed force measurements. In such embodiments, the imputed force measurements corresponding to the touch input indicate a change in the ultrasonic signal.

FIG. 1 is a schematic diagram illustrating an embodiment of a piezoresistive bridge structure that can be utilized as a strain sensor. Piezoresistive bridge structure 100 includes four piezoresistive elements that are connected together as two parallel paths of two piezoresistive elements in series (e.g., Wheatstone Bridge configuration). Each parallel path acts as a separate voltage divider. The same supply voltage (e.g., $V_{in}$ of FIG. 1) is applied to both of the parallel paths. By measuring a voltage difference (e.g., $V_{out}$ of FIG. 1) between a mid-point at one of the parallel paths (e.g., between piezoresistive elements $R_1$ and $R_2$ in series as shown in FIG. 1) and a mid-point of the other parallel path (e.g., between piezoresistive elements $R_3$ and $R_4$ in series as shown in FIG. 1), a magnitude of a physical disturbance (e.g. strain) applied on the piezoresistive structure can be detected.

In some embodiments, rather than individually attaching separate already manufactured piezoresistive elements together on to a backing material to produce the piezoresistive bridge structure, the piezoresistive bridge structure is manufactured together as a single integrated circuit component and included in an application-specific integrated circuit (ASIC) chip. For example, the four piezoresistive elements and appropriate connections between are fabricated on the same silicon wafer/substrate using a photolithography microfabrication process. In an alternative embodiment, the piezoresistive bridge structure is built using a microelectromechanical systems (MEMS) process. The piezoresistive elements may be any mobility sensitive/dependent element (e.g., as a resistor, a transistor, etc.).

Figure 2:
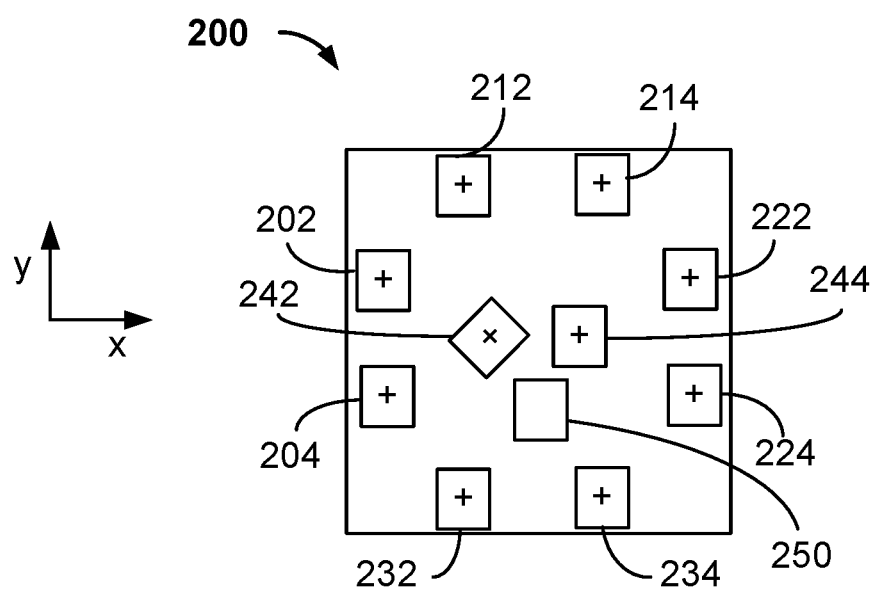
FIG. 2 depicts an embodiment of an integrated sensor.

FIG. 2 is a block diagram depicting an embodiment of integrated sensor 200 that can be used to sense forces (e.g. a force sensor). In particular, forces input to a device may result in flexing of, expansion of, or other physical disturbance in the device. Such physical disturbances may be sensed by force sensors. Integrated sensor 200 includes multiple strain sensors 202, 204, 212, 214, 222, 224, 232, 234, 242 and 244. Each strain sensor 202, 204, 212, 214, 222, 224, 232, 234, 242 and 244 may be a piezoresistive element such as piezoresistive element 100. In other embodiments, another strain measurement device might be used. Strain sensors 202, 204, 212, 214, 222, 224, 232, 234, 242 and 244 may be fabricated on the same substrate. Multiple integrated sensors 200 may also be fabricated on the same substrate and then singulated for use. Integrated sensor 200 may be small, for example five millimeters by five millimeters (in the x and y directions) or less.

Each strain sensor 202, 204, 212, 214, 222, 224, 232, 234, 242 and 244 is labeled with a + sign indicating the directions of strain sensed. Thus, strain sensors 202, 204, 212, 214, 222, 224, 232, 234 and 244 sense strains (expansion or contraction) in the x and y directions. However, strain sensors at the edges of integrated sensor 200 may be considered to sense strains in a single direction. This is because there is no expansion or contraction beyond the edge of integrated sensor 200. Thus, strain sensors 202 and 204 and strain sensors 222 and 224 measure strains parallel to the y-axis, while strain sensors 212 and 214 and strain sensors 232 and 234 sense strains parallel to the x-axis. As can be seen in FIG. 2, strain sensor 242 has been configured in a different direction. Thus, strain sensor 242 measures strains in the xy direction (parallel to the lines x=y or x=−y). For example, strain sensor 242 may be used to sense twists of integrated sensor 200. In some embodiments, the output of strain sensor 242 is small or negligible in the absence of a twist to integrated sensor 200 or the surface to which integrated sensor 200 is mounted.

Thus, integrated sensor 200 obtains ten measurements of strain: four measurements of strain in the y direction from strain sensors 202, 204, 222 and 224; four measurements of strain in the x direction from sensors 212, 214, 232 and 234; one measurement of strains in the xy direction from sensors 242 and one measurement of strain from sensor 244. Although ten strain measurements are received from strain sensors 202, 204, 212, 214, 222, 224, 232, 234, 242 and 244, six measurements may be considered independent. Strain sensors 202, 204, 212, 214, 222, 224, 232, and 234 on the edges may be considered to provide four independent measurements of strain. In other embodiments, a different number of strain sensors and/or different locations for strain sensors may be used in integrated sensor 200.

Integrated sensor 200 also includes temperature sensor 250 in some embodiments. Temperature sensor 250 provide an onboard measurement of the temperatures to which strain sensors 202, 204, 212, 214, 222, 224, 232, 234, 242 and 244 are exposed. Thus, temperature sensor 200 may be used to account for drift and other temperature artifacts that may be present in strain data. Integrated sensor 200 may be used in a device for detecting touch inputs.

Figure 3:
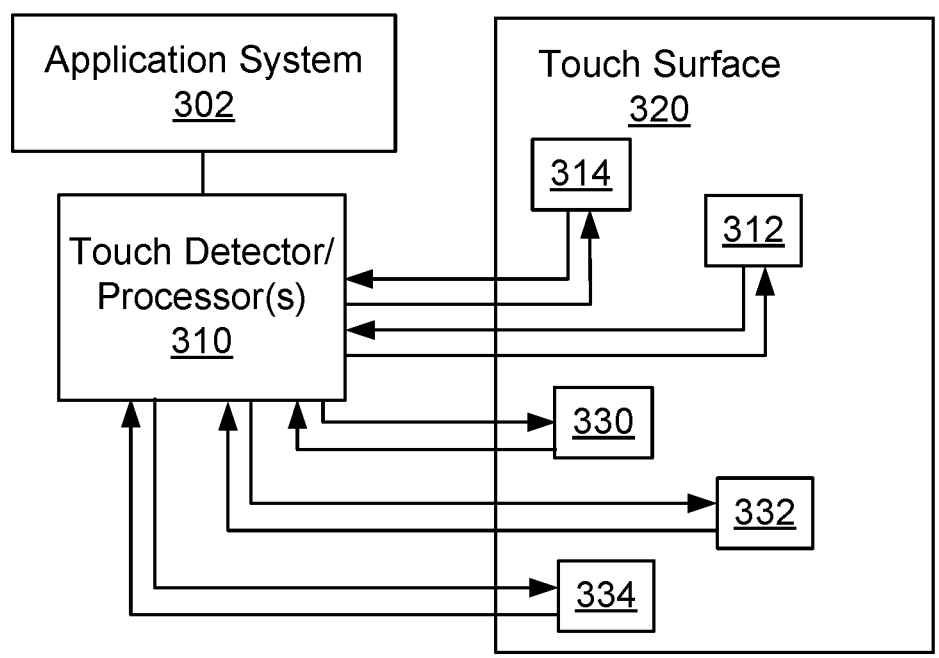
FIG. 3 is a block diagram illustrating an embodiment of a system for detecting a touch inputs.

FIG. 3 is a block diagram illustrating an embodiment of system 300 for detecting a touch input. System 300 may be considered part of a device utilizing touch inputs. Thus, system 300 may be part of a kiosk, an ATM, a computing device, an entertainment device, a digital signage apparatus, a mobile phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces for which a touch input is desired to be detected.

System 300 is connected with application system 302 and touch surface 320, which may be considered part of the device with which system 300 is used. System 300 includes touch detector 310, force sensors 312 and 314, transmitter 330 and touch sensors 332 and 334. For simplicity, only some portions of system 300 are shown. Touch surface 320 is a surface on which touch inputs are desired to be detected. For example touch surface may include the display of a mobile phone, the touch screen of a laptop, an edge of a mobile phone, a portion of the frame of the device or other surface. Force sensors 312 and 314 may be integrated sensors including multiple strain sensors, such as integrated sensor 200. In other embodiments, force sensors 312 and 314 may be an individual strain sensor. Other force sensors may also be utilized. Although two force sensors 312 and 314 are shown, another number is typically present. Touch sensors 330 and 332 may be piezoelectric sensors. Transmitter 330 may also be a piezoelectric device. In some embodiments, touch sensors 330 and 332 and transmitter 330 are interchangeable. Touch sensors 330 and 332 may be considered receivers of an ultrasonic wave transmitted by transmitter 330. In other cases, touch sensor 332 may function as a transmitter, while transmitter 330 and touch sensor 334 function as receivers. Thus, a transmitter-receiver pair may be viewed as a touch sensor in some embodiments. Multiple receivers may share a transmitter in some embodiments. Although only one transmitter 330 is shown for simplicity, multiple transmitters may be used. Similarly, although two touch sensors 332 and 334 are shown, another number may be used. Application system 302 may include the operating system for the device in which system 300 is used.

In some embodiments, touch detector 310 is integrated in an integrated circuit chip. Touch detector 310 includes one or more microprocessors that process instructions and/or calculations that can be used to program software/firmware and/or process data for touch detector 310. In some embodiments, touch detector 310 include a memory coupled to the microprocessor and configured to provide the microprocessor with instructions. Other components such as digital signal processors may also be used.

Touch detector 310 receives input from force sensors 312 and 314, touch sensors 332 and 334 and, in some embodiments, transmitter 330. For example, touch detector 310 receives force (e.g. strain) measurements from force sensors 312 and 314, touch (e.g. piezoelectric voltage) measurements from touch sensors 332 and 334. Touch detector 310 may provide signals and/or power to force sensors 312 and 314, touch sensors 332 and 334 and transmitter 330. For example, touch detector 310 may provide the input voltage (s) to force sensors 312 and 314, voltage or current to touch sensor(s) 332 and 334 and a signal to transmitter 330. Touch detector 310 utilizes the force (strain) measurements and/or touch (piezoelectric) measurements to determine whether a user has provided touch input touch surface 320. If a touch input is detected, touch detector 310 provides this information to application system 302 for use.

Signals provided from force sensors 312 and 314 are received by touch detector 310 and may be conditioned for further processing. For example, touch detector 310 receives the strain measurements output by force sensors 312 and 314 and may utilize the signals to track the baseline signals (e.g. voltage, strain, or force) for force sensors 312 and 314. Strains due to temperature may also be accounted for by touch detector 310 using signals from a temperature sensor, such as temperature sensor 250. Thus, touch detector 310 may obtain absolute forces (the actual force on touch surface 320) from force sensors 312 and 314 by accounting for temperature. In some embodiments, a model of strain versus temperature for force sensors 312 and 314 is used. In some embodiments, a model of voltage or absolute force versus temperature may be utilized to correct force measurements from force sensors 312 and 314 for temperature.

In some embodiments, touch sensors 332 and 334 sense touch via a wave propagated through touch surface 320, such as an ultrasonic wave. For example, transmitter 330 outputs such an ultrasonic wave. Touch sensors 332 and 334 function as receivers of the ultrasonic wave. In the case of a touch by a user, the ultrasonic wave is attenuated by the presence of the user's finger (or other portion of the user contacting touch surface 320). This attenuation is sensed by one or more of touch sensors 332 and 334, which provide the signal to touch detector 310. The attenuated signal can be compared to a reference signal. A sufficient difference between the attenuated signal and the reference signal results in a touch being detected. In some embodiments, absolute forces may be obtained from the imputed force measurements.

Encoded signals may be used in system 300. In some embodiments, transmitter 330 provides an encoded signal. For example, transmitter 330 may use a first pseudo-random binary sequence (PRBS) to transmit a signal. If multiple transmitters are used, the encoded signals may differ to be able to discriminate between signals. For example, the first transmitter may use a first PRBS and the second transmitter may use a second, different PRBS which creates orthogonality between the transmitters and/or transmitted signals. Such orthogonality permits a processor or sensor coupled to the receiver to filter for or otherwise isolate a desired signal from a desired transmitter. In some embodiments, the different transmitters use time-shifted versions of the same PRBS. In some embodiments, the transmitters use orthogonal codes to create orthogonality between the transmitted signals (e.g., in addition to or as an alternative to creating orthogonality using a PRBS). In various embodiments, any appropriate technique to create orthogonality may be used. In some embodiments, encoded signals may also be used for force sensors 312 and 314. For example, an input voltage for the force sensors 312 and 314 may be provided. Such an input signal may be encoded using PRBS or another mechanism.

Thus, using the combination of force sensors 312 and 314 and touch sensors 332 and 334, touches may be detected. Further, based upon which sensor 312, 314, 332 and/or 334 detects the touch and/or characteristics of the measurement (e.g. the magnitude of the force detected), the location of the touch in addition to the presence of a touch may be identified. For example, given an array of force and/or touch sensors, a location of a touch input may be triangulated based on the detected force and imputed force measurement magnitudes and the relative locations of the sensors that detected the various magnitudes (e.g., using a matched filter). Further, data from force sensors 312 and 314 is utilized in combination with data from touch sensors 332 and 334 to detect touches. Utilization of a combination of force and touch sensors allows for the detection of touch inputs while accounting for variations in temperature, bending, user conditions (e.g. the presence of a glove) and/or other factors. Thus, detection of touches using system 300 may be improved.

Figure 4:
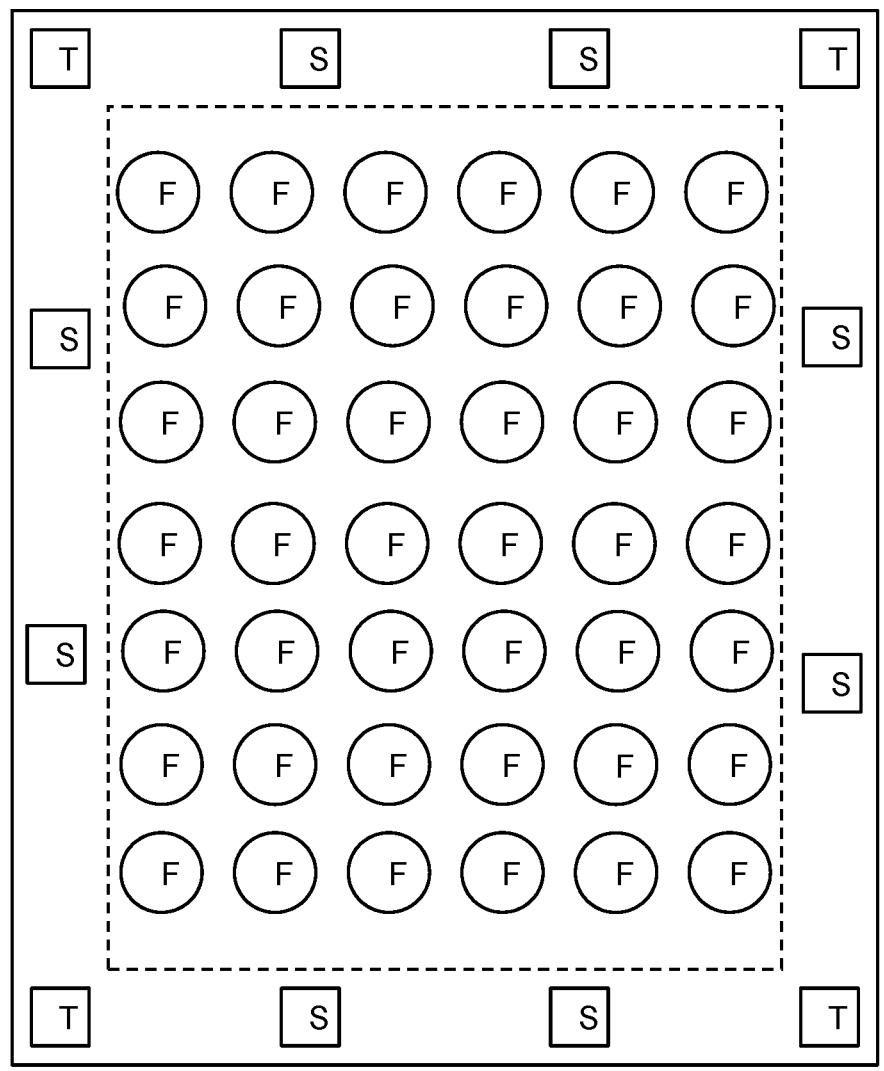
FIG. 4 is a diagram depicting an embodiment of a device utilizing force and touch sensors for performing touch input detection.
Figure 5:
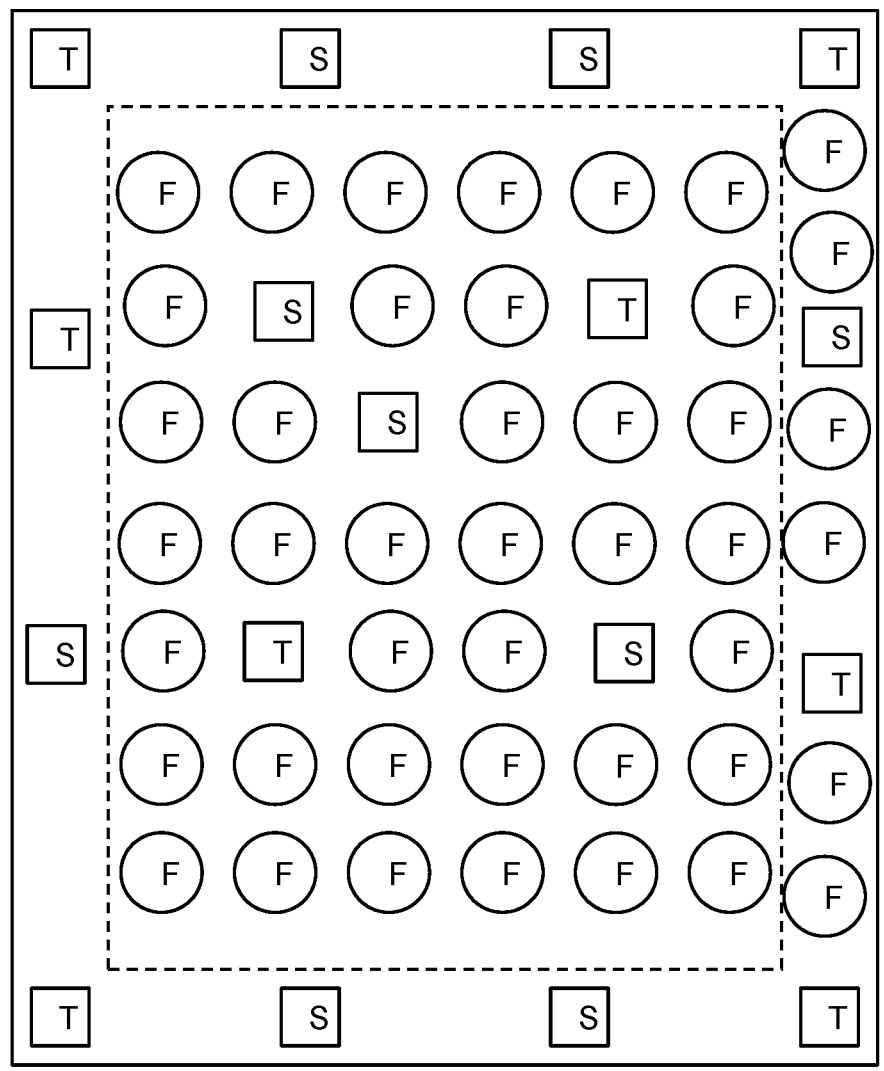
FIG. 5 is a diagram depicting an embodiment of a device utilizing force and touch sensors for performing touch input detection.
Figure 6:
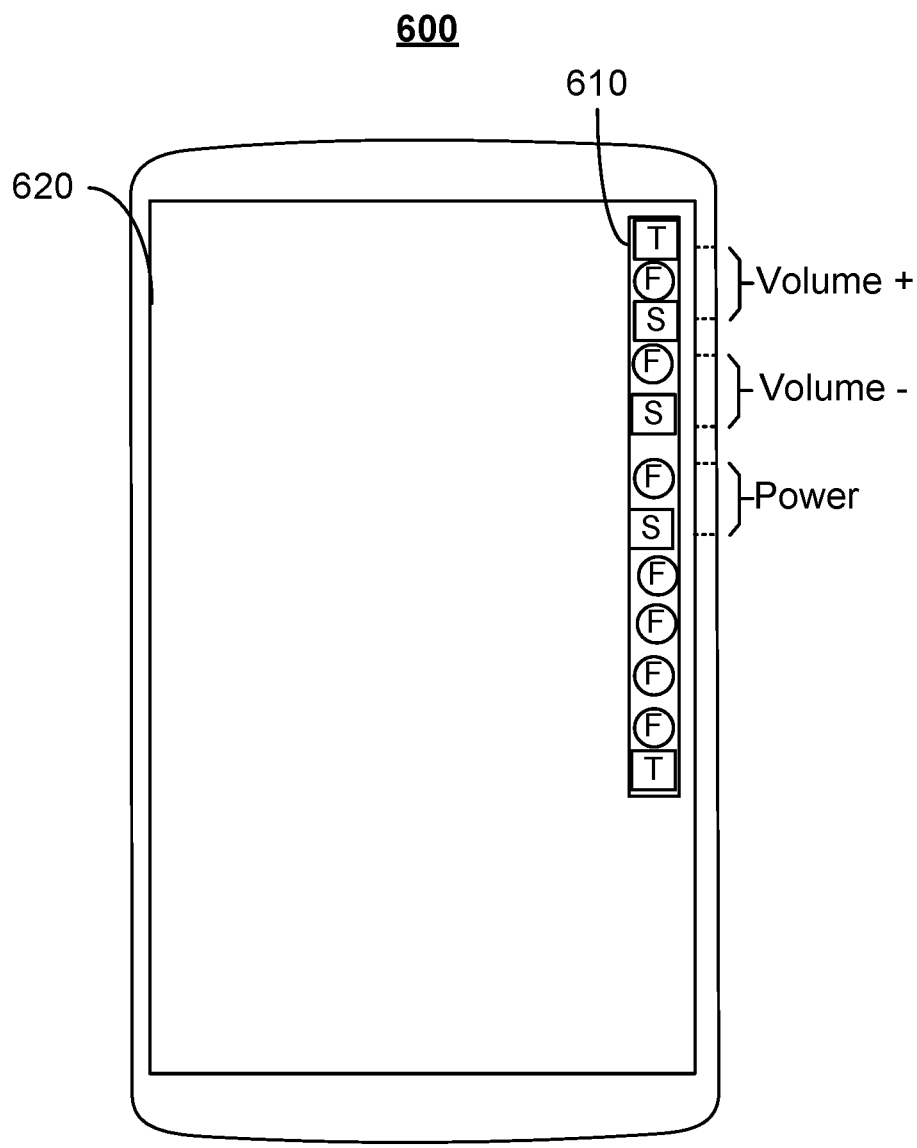
FIG. 6 is a diagram depicting an embodiment of a device utilizing force and touch sensors for performing touch input detection.

FIGS. 4-6 depict different embodiments of systems 400, 500, and 600 utilizing force and touch sensors for touch input detection. Force sensors, such as sensor(s) 100, 200, 312 and/or 314, are denoted by an "F". Such force sensors are shown as circles and may be considered to be piezoresistive (e.g. strain) sensors. Touch sensors such as sensor(s) 332 and/or 334 are shown by an "S". Transmitters, such as transmitter 330, are shown by a "T". Such sensors and transmitters may be piezoelectric sensors and are shown as rectangles. As indicated above, sensor component arrangements are utilized to detect a touch input along a touch surface area (e.g., to detect touch input on a touchscreen display, a portion of a mobile phone, or other region of a device desired to be sensitive to touch). The number and arrangement of force sensors, transmitters, and touch sensors shown in FIGS. 4-6 are merely examples and any number, any type and/or any arrangement of transmitters, force sensors and touch sensors may exist in various embodiments.

Figure 7:
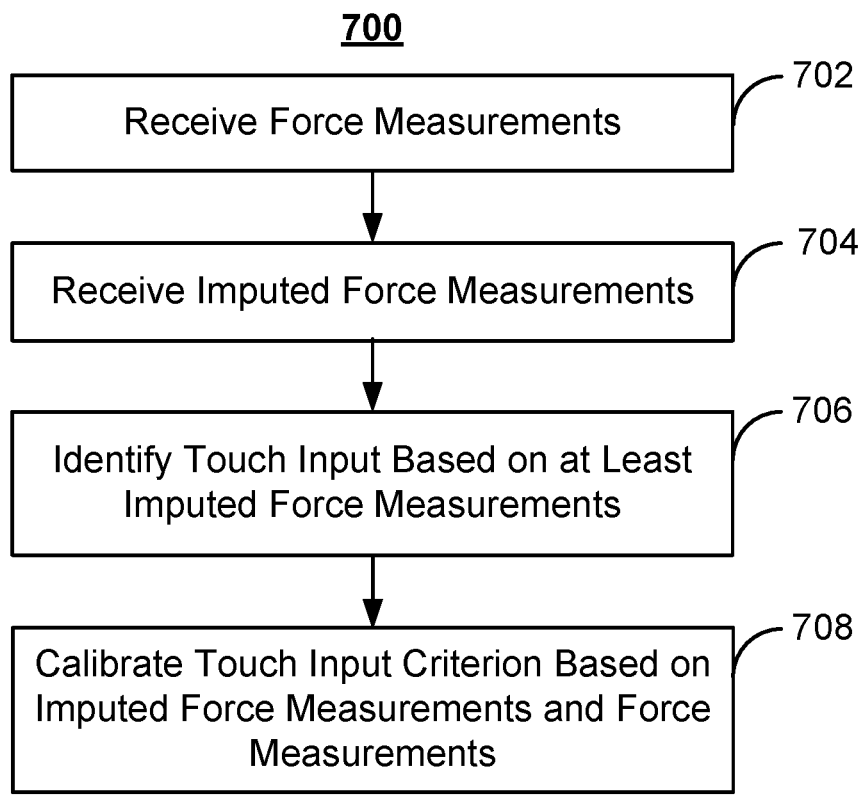
FIG. 7 is a flow chart depicting an embodiment of a method for detecting touch inputs using touch and force sensors.

FIG. 7 is a flow chart depicting an embodiment of method 700 for detecting touch inputs using touch and force sensors. In some embodiments, processes of method 700 may be performed in a different order, including in parallel, may be omitted and/or may include substeps.

Force measurements are received from force sensors, at 702. Force sensors, such as strain sensors, provide an output signal that is received at 702. In some embodiments, the signal corresponding to the force measurements provided is a voltage signal that may be conditioned, converted to a digital signal for processing, or otherwise processed. Similarly, imputed force measurements are received from touch sensors, at 704. In some embodiments, 704 includes transmitting ultrasonic signal(s), receiving the ultrasonic signal(s) at touch sensors, and the touch sensors providing the received ultrasonic signal for further processing. The ultrasonic signal(s) provided may be encoded. The received signals output by the touch sensors and corresponding to the imputed force measurements may also be encoded.

Touch inputs are identified based upon at least imputed force measurements, at 706. In some embodiments, 706 includes sensing a touch input using imputed force measurements only. For example, if a signal indicating that the ultrasonic wave is sufficient attenuated near particular touch sensors, then a touch input is detected at the corresponding location. In some embodiments, touch inputs are identified at 706 based on force and imputed force measurements. For example, a touch input might be detected only if a sufficient correlation exists between a touch sensor indicating a touch input has occurred and force measurements from nearby force sensors.

One or more touch input criterion is calibrated using force measurements and imputed force measurements, at 708. For example, a measured force from the imputed force measurements may be calibrated to a force measured by the force sensors. In some embodiments, a threshold for detecting a touch may be adjusted at 708. For example, a threshold for considering a change in the signal from the touch sensors sufficient to be a touch input may be increased or decreased based upon the force measurements and imputed force measurements. Consequently, touch inputs for varying user conditions can be identified.

For example, touch detector 310 receives force measurements from force sensors 312 and 314, at 702. Touch detector 310 receives imputed force measurements from touch sensors 332 and 334, at 704. For 704, transmitter 330 may provide an ultrasonic signal, which touch sensors (i.e. receivers) 332 and 334 receive. The received signal is provided back to touch detector. Touch detector 310 identifies touch inputs based upon at least the imputed force measurements, at 706. In embodiments, touch detector 310 may compare the received signal from touch sensors 332 and 334 to a reference signal. An attenuation in the received signal indicates that the user has provided a touch input to touch surface 320. Thus, a touch input is detected. In such embodiments, force measurements are utilized to calibrate one or more touch input criterion for touch sensors 332 and 223. For example, if a user is wearing a glove, the attenuation in the ultrasonic signal(s) sensed by touch sensors 332 and 334 may be reduced. Consequently, the corresponding imputed force measurements may not result in a detection of a touch input. However, force measurements from force sensors 312 and/or 314 correlated with and corresponding to the touch input of a user wearing a glove indicate a larger force than the imputed force measurements. In some embodiments, the measured forces corresponding to the output of touch sensors 332 and 334 are recalibrated (e.g. raised in this example) so that a reduced attenuation in the ultrasonic signal(s) is identified as a touch input. In some embodiments, a threshold for detecting a touch input using the signals from touch sensors 332 and 334 is recalibrated (e.g. decreased in this example) so that a reduced attenuation in the ultrasonic signal(s) is identified as a touch input. Thus, the user's condition can be accounted for. Further, touch sensors 312 and 334 may be piezoelectric sensors and thus insensitive to bends and temperature. Consequently, such effects may not adversely affect identification of touch inputs. In embodiments in which both force and imputed force measurements are used in identifying a touch input, only if force measurements from force sensors (e.g. strains indicating an input force at a particular time and location) and imputed force measurements (e.g. piezoelectric signals indicating an input force at a corresponding time and location) are sufficiently correlated. In such embodiments, there may be a reduced likelihood of bends or temperature effects resulting in a touch input being detected. The touch input criterion/criteria may then be calibrated as described above.

Thus, using method 700, touch inputs may be detected. Because both force and imputed force measurements (e.g. strain and piezoelectric measurements) are used for method 700, issues such as changes in temperature and bending of the touch surface may not adversely affect identification of touch inputs. Similarly, changes in the user, such as the user wearing a glove, may also be accounted for in detecting touch inputs. Further, the dynamic ranges of force sensors and touch sensors may differ. In some embodiments, piezoelectric touch sensors may be capable of sensing lighter touches than strain gauges used in force sensors. A wider variety of touch inputs may, therefore, be detected. Consequently, detection of touch inputs may be improved.

Figure 8:
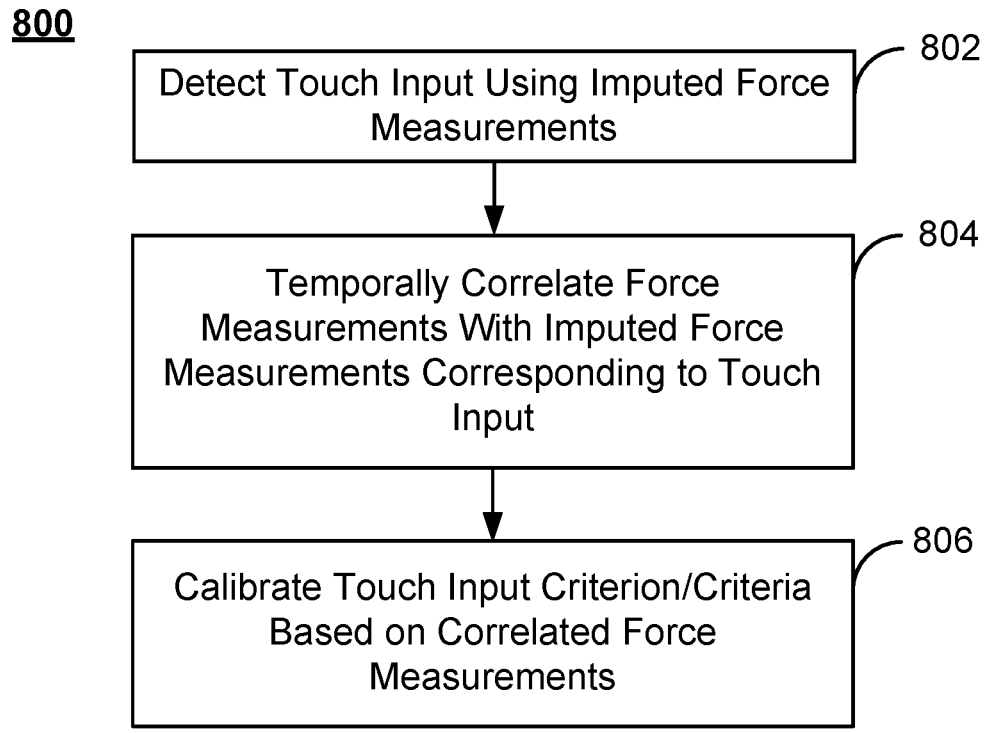
FIG. 8 is a flow chart depicting an embodiment of a method for calibrating touch input criteria using touch and force sensors.

FIG. 8 is a flow chart depicting an embodiment of method 800 for calibrating touch input criterial using touch and force measurements. In some embodiments, processes of method 800 may be performed in a different order, including in parallel, may be omitted and/or may include substeps. Method 800 may be carried out after force and imputed force measurements are received. Thus, method 800 may be considered as corresponding to 706 and 708 in some embodiments.

A touch input is detected based on the imputed force measurements, at 802. Thus, the measurements provided by one or more touch sensors are determined to indicate a touch input by a user.

The force measurements are temporally correlated the touch input, at 804. Stated differently, the force measurements made by corresponding force sensors at and/or around the time of the touch input are determined at 804. In some embodiments, force measurements captured throughout use are used as an indicator of the baseline for the force sensors. Such a baseline is an indicator of the force measurements in the absence of a touch. The baseline may change due to effects such as temperature or bending of the device. Thus, at 804, force measurements are identified as including a force distinct from the baseline.

One or more touch input criteria for the touch sensor(s) are calibrated based on the force measurements correlated with the touch input, at 806. For example, if the force measurements correlated with the touch input indicate a higher force than the imputed force measurements, then the touch input criterion (e.g. force measured by the touch sensor(s) and/or threshold in the signal for detecting a touch)

are recalibrated such that an indication of a touch input is identified for a smaller magnitude imputed force measurement. Similarly, if the force measurements correlated with the touch input indicate a lower force than the imputed force measurements, then the touch input criterion (e.g. force measured by the touch sensor(s) and/or threshold in the signal for detecting a touch) are recalibrated to provide an indication of a touch for a larger magnitude imputed force measurement.

Figure 9:
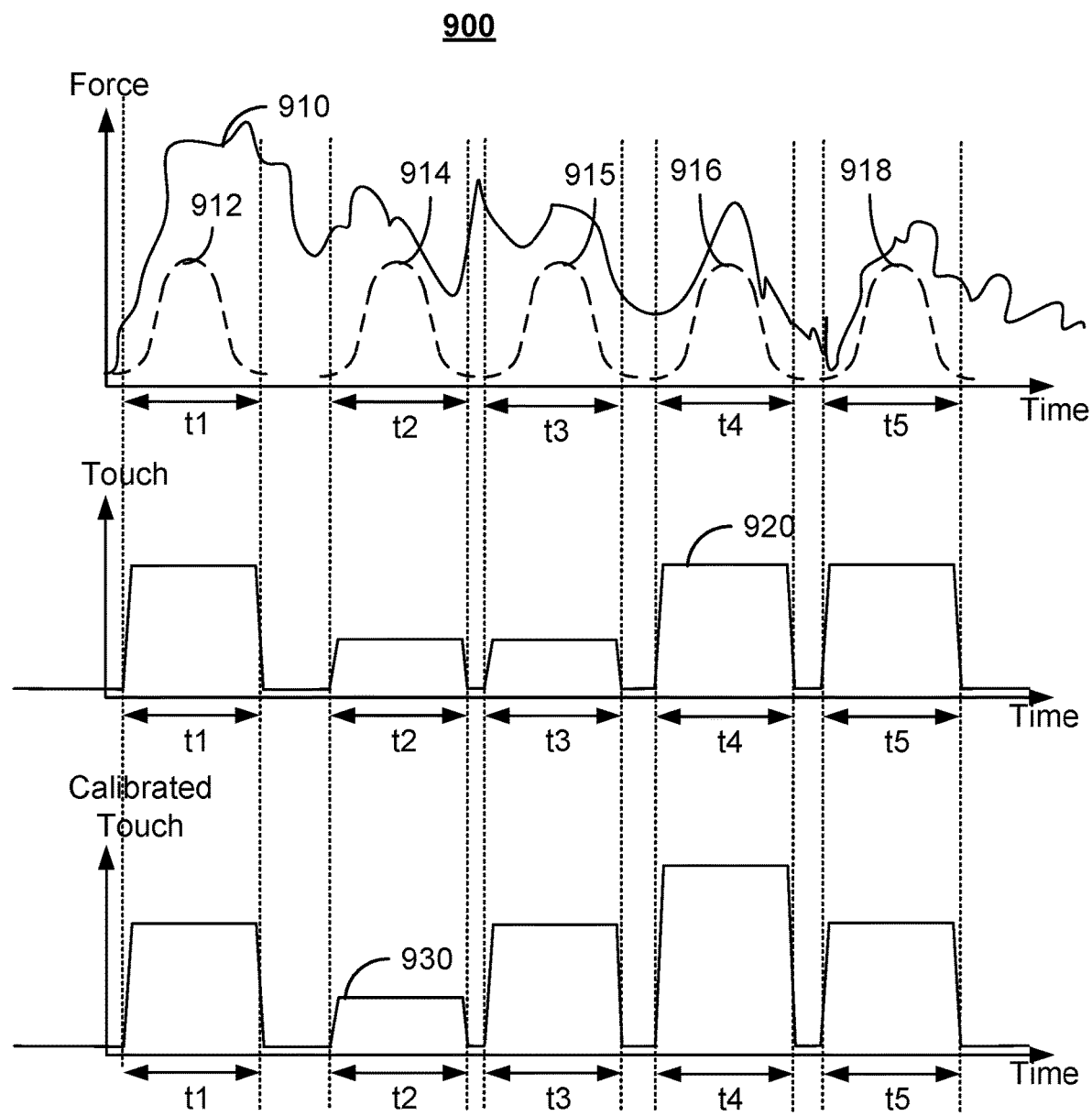
FIG. 9 depicts signals provided from touch and force sensors.

For example, FIG. 9 is a diagram 900 depicting signals provided from force and touch sensors versus time. Graph 910 indicates the force measurement by a force sensor, such as force sensor 312 or 314. Graph 920 indicates the imputed force measurements provided by a touch sensor 332 or 334 under different conditions. For example, the first, fourth and fifth peaks in graphs 920 may occur when a user's bare finger contacts touch surface 320 near touch sensor 332. The second and third peaks in graphs 920 may occur when a user's gloved finger contacts touch surface 320 near touch sensor 332. Graph 930 indicates the calibrated imputed force measurements corresponding to imputed force measurements shown in 920. Graph 910 may occur for force sensor 312 at the same times as graphs 920 and 930. Graphs 910, 920 and 930 are for explanatory purposes only and not intended to depict a particular set of measurements.

At 802, a touch input is detected for graph 920 at time interval t1 as a user's bare finger contacts touch surface 320. For example, a comparison of the received ultrasonic, (optionally) encoded signal from touch sensor 332 differs from the reference signal by an amount indicated by the height of signal 920 over time interval t1. Graph 930 has an analogous peak. As a result, a touch input is detected at 802. For the same time interval, graph 910 indicates the presence of a force (the local peak in graph 910/dashed peak 912). Thus, the local peak in graph 910 in t1 correlates force measurements corresponding to graph 910 with the imputed force measurements indicated by graph 920. In the event that the force corresponding to graph 910 is the same as (or within a threshold of) the force corresponding to graph 920 for time interval t1, the touch input criterion (e.g. measured force or calibrated output voltage) may not be recalibrated.

However, suppose a touch input for graph 920 is detected at time interval t2. Calibrated touch graph 930 includes a corresponding small peak. The corresponding portion of graph 910 (e.g. corresponding to dashed peak 914) indicates the presence of a force larger than the force corresponding to graph 920 at time t2. The magnitude of the absolute force for time interval t2 is substantially the same as for time interval t1. Consequently, the touch input criterion is recalibrated such that the peak in graph 920 at t2 would correspond to the same force as graph 910. Thus, a user contacting touch surface 320 with a gloved finger may still be recognized as a touch. A user's gloved finger again contacts touch surface 320 in time interval t3 (after the recalibration for interval t2). Graph 920 still indicates a smaller imputed force measurement. However, peak 915 indicates the same absolute force as the remaining peaks 912, 914, 916 and 918. However, recalibrated touch graph 930 includes a peak in interval t3 similar to that shown in t1. A user then removes their glove. The user's bare finger contacting touch surface 320 corresponds to the peaks in graphs 910 and 920 at time t4. As a result, graph 930 indicates a calibrated force larger than the corresponding portion of force sensor graph 910. Consequently, the touch input criterion is recalibrated such that a larger imputed force measurement is required to be recognized as a touch. Stated differently, the calibrated touch for the same absolute force would be smaller. Thus, at time t5, a user's bare finger again contacts touch surface 320. The substantially the same force is indicated by force measurements at time interval t5. Similarly, graph 920 that indicates the same imputed force measurements in interval t5 as for intervals t1 and t4. Because the touch input criterion has been recalibrated, graph 930 now indicates a touch of approximately the same force in interval t5 as in intervals t1 and t3.

Thus, using method 800, not only can touch input be identified, but changes in the user's condition accounted for. As a result, touch sensors, such as piezoelectric touch sensors, may still be able to accurately detect touch input. Thus, the combination of force sensors and touch sensors allows for improved detection of touch inputs.

Figure 10:
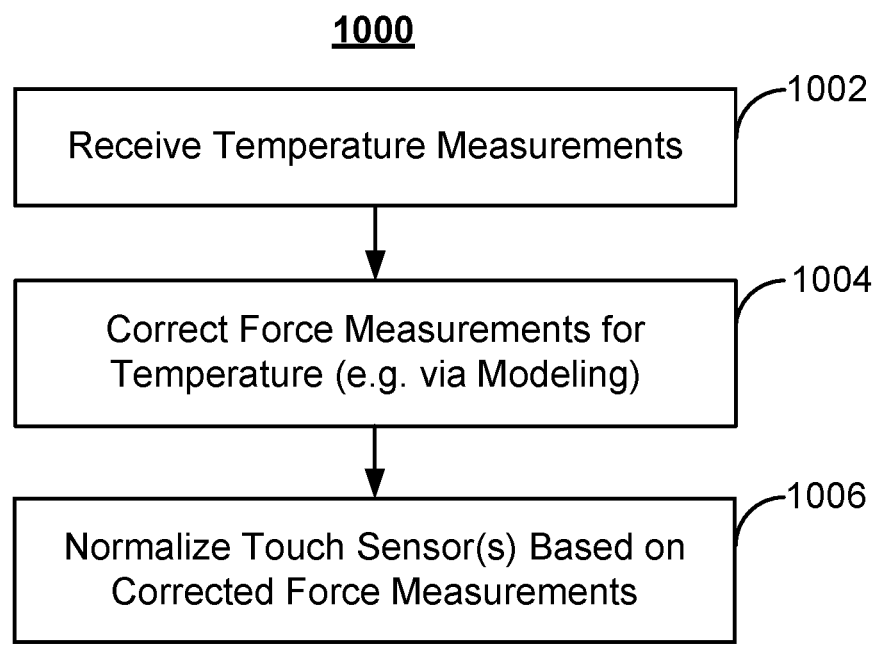
FIG. 10 is a flow chart depicting an embodiment of a method for calibrating force sensors and touch sensors.

FIG. 10 is a flow chart depicting an embodiment of method 1000 for calibrating force sensors and touch sensors. In some embodiments, processes of method 1000 may be performed in a different order, including in parallel, may be omitted and/or may include substeps. Method 1000 may be carried out in conjunction with method(s) 700 and/or 800.

Temperature measurements are received, at 1002. The temperature measurements are provided by sensors in proximity to the force sensors. For example, measurements may be provided by temperature sensor 250 that is part of integrated (force) sensor 200.

The force measurements received (e.g. at 702) are corrected for temperature, at 1004. Thus, the portion of the force measurements (e.g. voltage, strain, or absolute force) based on temperature-induced changes may be accounted for (e.g. subtracted from the force measurements). In some embodiments, only the force measurements corresponding to touch inputs being detected are corrected. For example, only force measurements corresponding to time intervals t1, t2, t3, t4 and t5 of diagram 900 are corrected at 1004. In some embodiments, all force measurements are corrected. In some embodiments, 1004 corrects raw data received at 1002, such as voltage. In some embodiments, 1004 corrects the strain corresponding to the raw data. In some embodiments, 1004 corrects the absolute force corresponding to the strain. Thus, an absolute force may be provided at 1004. In some embodiments, the correction at 1004 is based upon a model that is dynamically adapted. The baseline force measurements (force measurements in the absence of a touch detected by the touch sensors) are tracked as part of 1004 and/or 702. The profile of the force measurements across multiple force sensors may also be determined at 1004. If the profile indicates that the touch surface is not being subjected to a bend, the temperature model may be updated to reflect characteristics of the baseline. Further, the model may include factors such as adhesive used in conjunction with the force sensors, aging of the force sensors and/or other factors. Consequently, the model may provide a more accurate, adaptive correction to the force measurements. Further, bends may also be accounted for. For example, at 1004 the profile may be utilized to adjust a correction for temperature in the presence of a both a bend and a user touch. Thus, the force measurements may be corrected for temperature and/or other effects at 1004.

Using the corrected force measurements corresponding to a touch input detected utilizing imputed force measurements, the imputed force measurements are normalized, at 1006. Thus, the absolute force corresponding to the imputed force measurements may be considered to be normalized at 1006. Stated differently, 1006 normalizes the touch input criterion of measured force from touch sensors. In some embodiments, the absolute force determined at 1004 is compared to the force corresponding to the imputed force measurements from the touch sensors. If the absolute force determined at 1004 is greater than the force corresponding to the imputed force measurements, the measured force is normalized to a larger force for a given imputed force measurement. If the absolute force determined at 1004 is less than the force corresponding to the imputed force measurements, the measured force is normalized to a smaller force for a given imputed force measurement. Thus, imputed force measurements are calibrated to the absolute force measurement.

For example, referring to FIGS. 2, 3, 9 and 10, temperature measurements from temperature sensor 250 of FIG. 2, are received by touch detector 310 at 1002. These measurements are used to correct the force measurements, for example from force sensor 312, at 1004. Dashed lines 912, 914, 915, 916 and 918 of FIG. 9 indicate the corrected force measurements for time intervals t1, t2, t3, t4 and t5, respectively. The baseline, corresponding to graph 910 outside of intervals t1, t2, t3, t4 and t5, may also be utilized to dynamically update the model used in correcting the force measurements. The corresponding measurements, such as from touch sensor 332 and/or 334 are normalized, at 1006. As indicated in FIG. 9, the same absolute force in graphs 912, 914, 915, 916 and 918 corresponds to the imputed force measurements in intervals t1, t2, t3, t4 and t5. However, graph 920 indicates that the force corresponding to imputed force measurements by touch sensor 332 varies. This may occur, for example, because a user is puts on a glove after time interval t1 and takes off the glove after time interval t3. Consequently, peak 914 indicates the presence of a force larger than the force corresponding to graph 920 at time interval t2. Consequently, the imputed force measurements are normalized such that the peak in graph 930 at t2 would correspond to the same force as graph 914. Thus, a user contacting touch surface 320 with a gloved finger may still be recognized as a touch. This can be seen in interval t2, when the user again contacts touch surface 32 with a gloved finger. Although the imputed force measurement indicated by graph 920 is smaller due to the glove, graph 930 indicates a larger calibrated touch force in interval t3. The user then removes their glove and the user's bare finger contacts touch surface 320. This situation corresponds to peak 916 and the peak in graph 920 at time t4. As a result, graph 930 indicates a force larger than the corresponding peak 916 (or than the raw measurement of graph 920). Consequently, the imputed force measurements are recalibrated such that a particular signal from touch sensor 332 corresponds to a smaller force. When the user again contacts touch surface 320 with a bare finger at time interval t5, the appropriate force is indicated in graph 930.

Thus, using method 1000, temperature effects for the force sensors may be accounted for. When used in connection with methods 700 and 800, temperature effects on force sensors, bending effects on force sensors and changes in the user's touch may be accounted for. Further, the dynamic ranges of force sensors and touch sensors may differ. In some embodiments, piezoelectric touch sensors may be capable of sensing lighter touches than strain gauges used in force sensors. Consequently, a wider variety of touch inputs may be detected. Thus, detection of touch inputs can be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of force sensors;
   a plurality of touch sensors;
   a processor configured to:
      receive a plurality of force measurements from a force sensor of the plurality of force sensors, each of the plurality of force measurements having a first magnitude;
      receive a plurality of imputed force measurements from a touch sensor of the plurality of touch sensors, each of the plurality of imputed force measurements having a second magnitude;
      identify a touch input based upon at least the plurality of imputed force measurements and at least one touch input criterion; and
      calibrate the at least one touch input criterion based upon the first magnitude of each of the plurality of force measurements and the second magnitude of each of the plurality of imputed force measurements, wherein the at least one touch input criterion includes a touch detection threshold corresponding to an imputed force magnitude, and wherein to calibrate the at least one touch input criterion the processor is further configured to adjust the touch detection threshold based on a difference between the first magnitude and the second magnitude; and
   a memory coupled to the processor and configured to provide the processor with instructions.

2. The system of claim 1, wherein to calibrate the at least one touch input criterion, the processor is further configured to:
   temporally correlate a portion of the plurality of force measurements with the touch input; and
   calibrate the at least one touch input criterion based on the portion of the plurality of force measurements temporally correlated to the touch input, the at least one touch input criterion corresponding to the touch sensor.

3. The system of claim 2, further comprising:
   at least one temperature sensor configured to provide a plurality of temperature measurements corresponding to the force sensor; and
   wherein the processor is further configured to correct the portion of the plurality of force measurements based on the plurality of temperature measurements, thereby providing corrected force measurements.

4. The system of claim 3, wherein the corrected force measurements correspond to an absolute force and wherein to calibrate the at least one touch input criterion based on the portion of the plurality of force measurements temporally correlated to the touch input, the processor is further configured to:
   normalize to the absolute force a measured force corresponding to at least a portion of the plurality of imputed force measurements.

5. The system of claim 2, wherein a remaining portion of the plurality of force measurements corresponds to a baseline for the force sensor.

6. The system of claim 2, wherein the plurality of touch sensors further includes:
   a plurality of transmitter-receiver pairs, for providing an ultrasonic signal across a surface of a device and receiving the ultrasonic signal; and
   wherein the plurality of imputed force measurements corresponding to the touch input indicate a change in the ultrasonic signal, the change in the ultrasonic signal corresponding to the touch input.

7. The system of claim 6, wherein the plurality of touch sensors includes a plurality of piezoelectric sensors configured to sense the ultrasonic signal; and wherein the transmitter includes a piezoelectric transmitter.

8. The system of claim 1, wherein the plurality of force sensors includes a plurality of strain sensors.

9. A method, comprising:
receiving a plurality of force measurements from a force sensor of a plurality of force sensors, each of the plurality of force measurements having a first magnitude;
receiving a plurality of imputed force measurements from a touch sensor of a plurality of touch sensors, each of the plurality of imputed force measurements having a second magnitude;
identifying a touch input based upon at least the plurality of imputed force measurements and at least one touch input criterion; and
calibrating the at least one touch input criterion based upon the first magnitude of each of the plurality of force measurements and the second magnitude of each of the plurality of imputed force measurements, wherein the at least one touch input criterion includes a touch detection threshold corresponding to an imputed force magnitude, and wherein the calibrating the at least one touch input criterion further includes adjusting the touch detection threshold based on a difference between the first magnitude and the second magnitude.

10. The method of claim 9, wherein calibrating the at least one touch input criterion further includes:
temporally correlating a portion of the plurality of force measurements with the touch input; and
calibrating the at least one touch input criterion based on the portion of the plurality of force measurements temporally correlated to the touch input, the at least one touch input criterion corresponding to the touch sensor.

11. The method of claim 10, further comprising:
receiving a plurality of temperature measurements corresponding to the force sensor; and
correcting the portion of the plurality of force measurements based on the plurality of temperature measurements to provide corrected force measurements.

12. The method of claim 11, wherein the corrected force measurements correspond to an absolute force and wherein calibrating the at least one touch input criterion based on the portion of the plurality of force measurements temporally correlated to the touch input further includes:
normalizing to the absolute force a measured force corresponding to at least a portion of the plurality of imputed force measurements.

13. The method of claim 10, wherein a remaining portion of the plurality of force measurements correspond to a baseline for the force sensor.

14. The method of claim 10, further comprising:
transmitting an ultrasonic signal across a surface of a device; and
wherein the plurality of imputed force measurements corresponding to the touch input indicate a change in the ultrasonic signal, the change in the ultrasonic signal corresponding to the touch input.

15. A computer program product for detecting touch inputs, the computer program product being embodied in a tangible computer readable storage medium and comprising computer instructions for:
receiving a plurality of force measurements from a force sensor of a plurality of force sensors, each of the plurality of force measurements having a first magnitude;
receiving a plurality of imputed force measurements from a touch sensor of a plurality of piezo sensors, each of the plurality of imputed force measurements having a second magnitude;
identifying a touch input based upon at least the plurality of imputed force measurements, and at least one touch input criterion; and
calibrating the at least one touch input criterion based upon the first magnitude of each of the plurality of force measurements and the second magnitude of each of the plurality of imputed force measurements, wherein the at least one touch input criterion includes a touch detection threshold corresponding to an imputed force magnitude, and wherein the calibrating the at least one touch input criterion further includes adjusting the touch detection threshold based on a difference between the first magnitude and the second magnitude.

16. The computer program product of claim 15, wherein the computer instructions for calibrating the at least one touch input criterion further include computer instructions for:
temporally correlating a portion of the plurality of force measurements with the touch input; and
calibrating the at least one touch input criterion based on the portion of the plurality of force measurements temporally correlated to the touch input, the at least one touch input criterion corresponding to the touch sensor.

17. The computer program product of claim 16, further comprising computer instructions for:
receiving a plurality of temperature measurements corresponding to the force sensor; and
correcting the portion of the plurality of force measurements based on the plurality of temperature measurements to provide corrected force measurements.

18. The computer program product of claim 17, wherein the corrected force measurements correspond to an absolute force and wherein the computer instructions for calibrating the at least one touch input criterion based on the plurality of force measurements temporally correlated to the touch input further include computer instructions for:
normalizing to the absolute force a measured force corresponding to at least a portion of the plurality of imputed force measurements.

19. The computer program product of claim 16, wherein a remaining portion of the plurality of force measurements correspond to a baseline for the force sensor.

20. The computer program product of claim 16 wherein an ultrasonic signal is transmitted across a surface of a device; and
wherein the plurality of imputed force measurements corresponding to the touch input indicate a change in the ultrasonic signal, the change in the ultrasonic signal corresponding to the touch input.

21. The system of claim 1, wherein the plurality of force sensors include a plurality of strain sensors and wherein the plurality of touch sensors include a plurality of ultrasonic sensors.

22. The method of claim 9, wherein the plurality of force sensors include a plurality of strain sensors and wherein the plurality of touch sensors include a plurality of ultrasonic sensors.

23. The computer program product of claim 15, wherein the plurality of force sensors include a plurality of strain sensors and wherein the plurality of touch sensors include a plurality of ultrasonic sensors.

\* \* \* \* \*